United States Patent [19]
Bonella et al.

[11] Patent Number: 5,404,559
[45] Date of Patent: Apr. 4, 1995

[54] APPARATUS FOR ASSERTING AN END OF CYCLE SIGNAL TO A PROCESSOR BUS IN A COMPUTER SYSTEM IF A SPECIAL CYCLE IS DETECTED ON THE PROCESSOR BUS WITHOUT TAKING ACTION ON THE SPECIAL CYCLE

[75] Inventors: Randy M. Bonella, Cypress; John A. Landry; Gary W. Thome, both of Tomball, all of Tex.

[73] Assignee: Compaq Computer Corporation, Houston, Tex.

[21] Appl. No.: 34,096

[22] Filed: Mar. 22, 1993

[51] Int. Cl.⁶ .................................. G06F 13/00
[52] U.S. Cl. ............................. 395/800; 364/239; 364/DIG. 1
[58] Field of Search ............... 395/800, 425, 375, 575, 395/500; 364/239, DIG. 1

[56] References Cited
U.S. PATENT DOCUMENTS

| | | | |
|---|---|---|---|
| 4,716,527 | 12/1987 | Graciotti | 395/500 |
| 4,779,190 | 10/1988 | O'Dell et al. | 395/500 |
| 5,146,582 | 9/1992 | Begun | 395/500 |
| 5,159,679 | 10/1992 | Culley | 395/425 |
| 5,167,026 | 11/1992 | Murray et al. | 395/375 |
| 5,191,657 | 3/1993 | Ludwig et al. | 395/325 |
| 5,325,499 | 6/1994 | Kummer et al. | 395/425 |
| 5,325,503 | 6/1994 | Stevens et al. | 395/425 |

OTHER PUBLICATIONS
Intelcorp., Pentium Processor Users Manual, vol. 1: Pentium Processor Data Book-Bus Functional Description, Chapter 6, pp. 6-1 to 6-52, 1993.

*Primary Examiner*—Alyssa H. Bowler
*Assistant Examiner*—John Harrity
*Attorney, Agent, or Firm*—Pravel, Hewitt, Kimball & Krieger

[57] ABSTRACT

Filtering logic coupled between the microprocessor and the host bus to decode illegal special cycles executed by the processor to prevent these cycles from appearing on the host bus, which would otherwise be misinterpreted by logic coupled to the host bus. In the preferred embodiment, a modularized computer system based primarily on the 80386 or i486 microprocessors by Intel is upgraded to the new P5 or Pentium processor, also by Intel. The host and I/O buses are not modified and operate at the same speed and data width as in the previous systems. A processor board is upgraded with the P5 processor and includes the filtering logic according to the present invention. The P5 processor includes 8 byte enable bits as compared to the 4 byte enable bits used by the microprocessors 80386 and i486. Two new special cycles supported by the P5 processor are not supported by the previous host bus and would cause erroneous operation if allowed to be executed on the host bus. The filtering logic detects the two new cycles and prevents the cycles from being passed to the host bus.

7 Claims, 4 Drawing Sheets

APPARATUS FOR ASSERTING AN END OF CYCLE SIGNAL TO A PROCESSOR BUS IN A COMPUTER SYSTEM IF A SPECIAL CYCLE IS DETECTED ON THE PROCESSOR BUS WITHOUT TAKING ACTION ON THE SPECIAL CYCLE

BACKGROUND OF THE INVENTION

1. Field of the Invention

The present invention relates to an apparatus and method for filtering special cycles of a microprocessor from appearing on the host bus to prevent improper operations.

2. Description of the Related Art

Microprocessor-based computer systems have been increasing in performance at a tremendous rate. Much of this increase has been based on the improvements in the microprocessor itself. For example, clock speeds are reaching those previously used only by main frame computers. The P5 or Pentium microprocessor, manufactured by Intel Corporation (Intel), is a next generation microprocessor which has very high performance including superscalar architecture and integrated and separate code and data internal caches. The internal data cache is a write-back cache. The P5 uses a full 64-bit data path and provides significant performance improvements over the 32-bit data path used by prior microprocessors. The P5 is designed to be fully software-compatible with the 80386 and the i486 microprocessors, also manufactured by Intel, even though the 80386 and i486 microprocessors operate on a 32-bit data path and typically at slower clock rates. The Host bus for systems based on the 80386 or i486 microprocessors also use a 32-bit data path and the clock speed of the microprocessor, such as 25 or 33 MHz.

It is considered desirable to upgrade existing computer systems based on the 80386 or i486 microprocessors to utilize the advances provided by the P5 processor, without significantly affecting the remaining portions of the computer system. For example, a computer system may include a processor portion, a system board portion and an input/output (I/O) portion, where the processor and system portions are typically separated by a host bus. The I/O portion is typically centered around an I/O or expansion bus, such as the Industry Standard Architecture (ISA) or the Extended ISA (EISA) bus. A bus controller, such as an EISA bus controller (EBC), is coupled between the host and I/O buses. Since devices coupled to the host bus and residing on the system board are compatible with the host bus, the data width, clock speed and other specifications must remain mostly unchanged. Thus, it is desirable to upgrade the processor portion while leaving the system and I/O portions substantially unchanged.

The most obvious approach would be to use a P5 as the processor in a 386/486 microprocessor host bus system, where the host bus is isolated from the processor bus with cycle conversion logic. The cycle conversion logic would simply convert each 64-bit cycle to two 32-bit cycles. It has been discovered, however, that this simple solution is not adequate and causes erroneous operation. To illustrate this problem, it is first necessary to discuss special cycles executed by the microprocessors.

The 80386 and i486 microprocessors include four special cycles which are decoded using several control and byte enable signals to indicate which one of the four cycles is being executed. The four special cycles include a shutdown cycle, which is executed as a result of either an exception occurring while the microprocessor was attempting to call a double fault handler or when an internal parity error is detected. The shutdown cycle can also be initiated through software. Microprocessor utility logic, otherwise referred to as the CUC, is typically provided to detect the shutdown special cycle on the host bus and to respond by resetting the microprocessor. The bus controller also interprets the shutdown cycle and also asserts a signal to reset the microprocessor. A second special cycle, referred to as flush, is executed when a cache invalidate instruction is executed by the microprocessor. A third special cycle, referred to as halt, occurs after the microprocessor performs a HALT instruction. The fourth and final special cycle, referred to as write-back, occurs after the microprocessor executes a write-back invalidate instruction, to cause any write-back caches to flush. The M/IO* (memory/I/O), D/C* (data/code) and W/R* (write/read) signals, when asserted low, low and high respectively, indicate a special cycle is occurring. Four byte enable bits BE3*-BE0* indicate which of the four special cycles is occurring, where only one of the byte enable bits is asserted at a time during special cycles. An asterisk at the end of a signal name indicates negative logic, the signal being asserted when low. A shutdown special cycle is indicated as BE0* being 0, a FLUSH special cycle is indicated as BE1* being 0, a HALT special cycle is indicated as BE2* being 0 and a WRITE-BACK special cycle is indicated when BE3* is 0.

The P5 microprocessor uses four additional byte enable bits because of its 64 bit data path for a total of eight, namely BE7*-BE0*. The P5 supports all four of the special cycles described above plus two more. The first new special cycle is called a flush acknowledge, which is executed after the P5 writes back all of its dirty lines and flushes its internal data cache as a result of its input pin FLUSH* being asserted low, to indicate completion of the flush request. The P5 supports a second new special cycle, referred to as a branch trace message, which occurs if a tracing enable bit is set and if a branch instruction is executed and the branch is taken. The flush acknowledge and branch trace message special cycles are indicated by the same control signals, but the BE4* bit is asserted low for the flush acknowledge and the BE5* bit is asserted low for the branch trace message special cycle, respectively.

Cycle conversion logic coupled between the P5 microprocessor and the host bus converts a 64-bit cycle into two 32-bit cycles, which means that the upper BE7*-BE4* byte enable bits are remapped to the lower BE3*-BE0* byte enable bits during the second of the two 32-bit cycles executed on the host bus. This would cause erroneous operation, since the CUC logic would decode a flush acknowledge cycle as a shutdown cycle and would decode a branch trace message special cycle as a flush special cycle. Similarly, the bus controller also misinterprets the flush acknowledge and causes erroneous operation. Indeed, both the CUC and the bus controller would issue reset signals if the flush acknowledge special cycle were executed on the host bus, as that is the proper operation upon receipt of a shutdown indication.

It is therefore desirable to be able to use a P5 processor including the two new special cycles in cooperation with the host and I/O buses of 80386 or i486 microprocessor based systems with proper operation for all special cycles provided by the P5 processor.

SUMMARY OF THE PRESENT INVENTION

In a computer system according to the present invention, filtering logic is placed between the microprocessor and the host bus to decode "illegal" special cycles appearing on the processor bus and to prevent these cycles from appearing on the host bus, which would otherwise be misinterpreted by logic on the host bus. The preferred embodiment is a modularized system, which includes a separate processor board, a separate system board and a separate I/O board, so that the processor board can be easily replaced with a new processor board incorporating the P5 microprocessor.

To maximize performance of the new P5 microprocessor, the main memory is removed from the host bus and coupled more closely to the microprocessor to increase speed, utilize the full 64-bit data path and improve signal integrity. The memory controller is placed between the processor bus and the host bus and serves as the filter and cycle conversion logic according to the present invention. The new memory controller and associated main memory operate at significantly increased speed and use a significantly wider data bus. The memory controller is further implemented as a plurality of simpler interdependent state machines, including a front end block for handling processor bus interaction, a memory block for interfacing with the main memory, a host block to control the interfaces in the host bus, and a cache controller block for accessing and controlling an optional second level cache. The second level cache is preferably coupled to the processor bus and operates as a lookaside, write-through direct-mapped cache.

The front end controller block decodes processor cycles to determine which of the second level interdependent blocks within the memory controller should handle the cycle. The front end controller interprets the new special cycles and runs them locally. For example, a state machine within the front end controller decodes the branch trace message special cycle and returns a burst ready signal to the P5, indicating the end of the cycle. The cycle is not passed on to the host bus, but is essentially ignored. Thus, the branch trace message special cycle is never executed on the host bus. If a flush acknowledge cycle is executed by the P5 microprocessor, it is decoded by the memory controller and passed to the cache controller block. The cache controller handles the cycle, interfaces with the second level cache and then returns an early burst ready signal. The front end block then returns the burst ready signal to the P5 microprocessor without passing the special cycle on to the host bus.

In this manner, the two new special cycles are intercepted and filtered by the memory controller and are not executed on the host bus. Thus, the processor control logic and the bus controller do not see the unknown special cycles, which would otherwise cause an improper operation.

DETAILED DESCRIPTION OF THE PREFERRED EMBODIMENT

Figure 1:
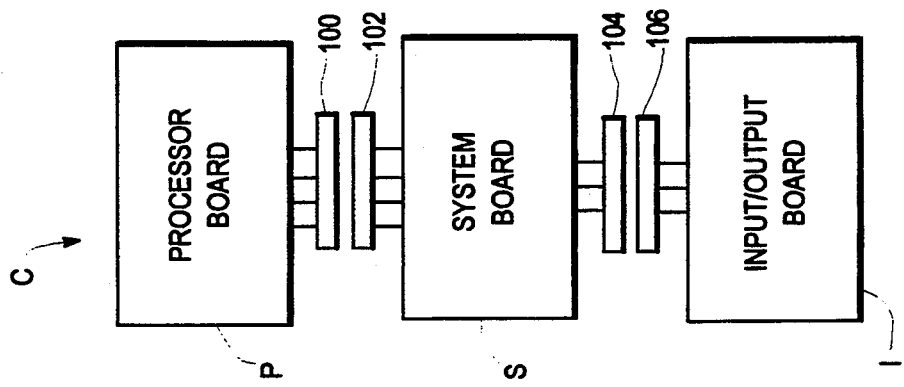
FIG. 1 is a simplified block diagram of a modularized computer system incorporating the present invention.

Referring now to FIG. 1, a computer system C according to the preferred embodiment is shown. A processor board P contains the processor, cache memory, main memory and associated equipment and a connector 100, preferably a socket to receive a card edge. The system board S contains common system elements and slots or connectors for interchangeable circuit boards. The system board S also contains an additional connector 104. The connector 104 mates with a connector 106 on an input/output (I/O) board I. Preferably, the I/O board I contains certain I/O related features of the computer C, such as the floppy and hard disk drive control units, an audio system and the parallel and serial ports. Additionally, the real time clock and CMOS memory is on the I/O board I.

This is noted to be an exemplary and preferred embodiment of the computer system C and it is understood that numerous other embodiments, such as having all of the components on a single system board or mother board as is common, could be readily developed.

Figure 2:
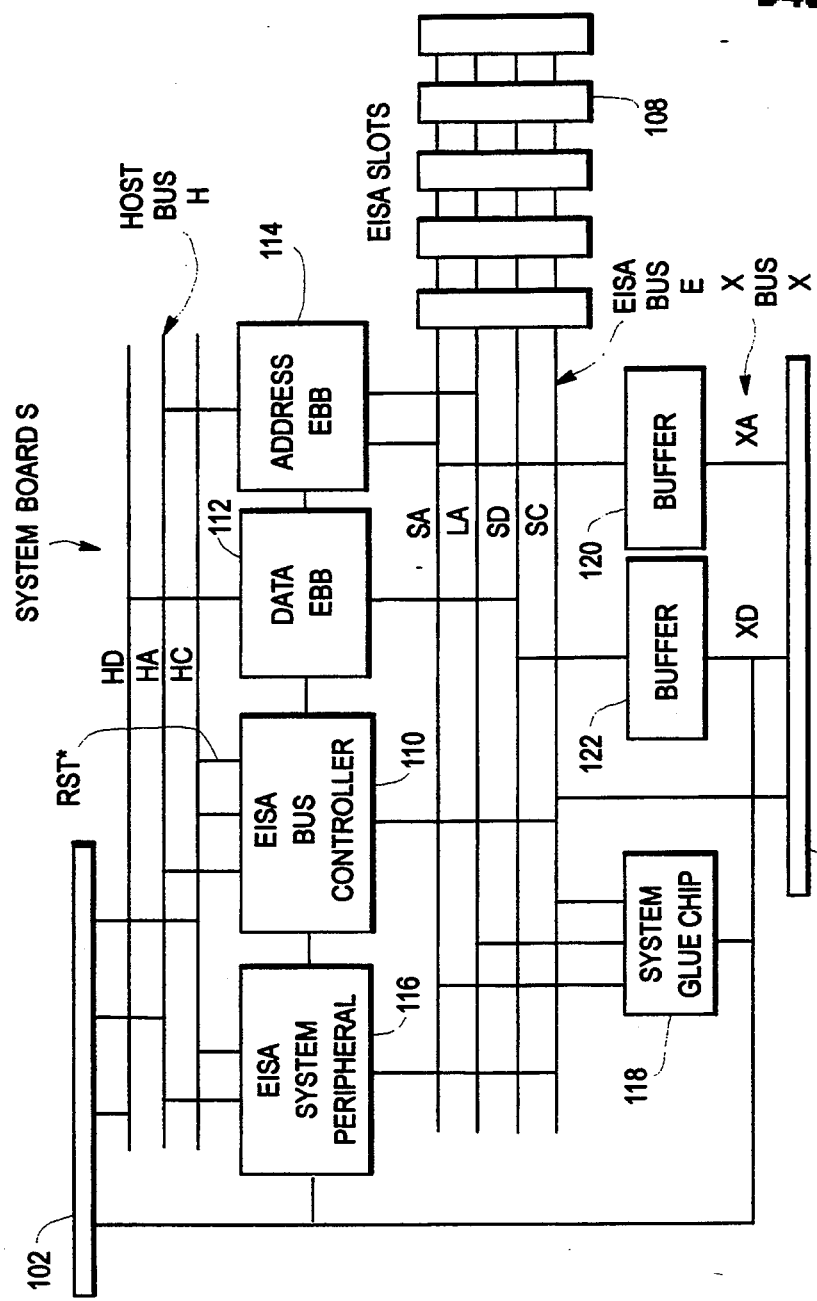
FIG. 2 is a block diagram of the system board of FIG. 1.

Referring now to FIG. 2, a block diagram of the system board S is shown. Two main buses, a host bus H and an EISA bus E, form the logical back bones of the system board S. The host bus H has three components, the host data or HD bus, the host address or HA bus and the host control or HC bus. Preferably the HD bus is 32 bits wide and the HA bus is provided for a 32-bit addressing space. The host bus H preferably operates substantially according to the i486 protocol, but includes capabilities for pipelining as supported by the 80386. The EISA bus E has four major components, the SA and LA or system and early address buses, the SD or system data bus and the SC or system control bus. A plurality of EISA slots 108 are connected to the EISA bus E. An EISA bus controller (EBC) 110, such as the 82358 by Intel, provides the necessary capabilities to convert between host bus H cycles and EISA bus E cycles and is connected between the HA and HC buses and the SC bus In the preferred embodiment, a variation of the 82358 is used, with one difference described below, but the 82358 could readily be used and would have the problem. The EBC 110 is connected to control a data EBB or EISA bus buffer 112, which provides the necessary data transceiving functions between the host bus H and the EISA bus E and provides the data assembly and disassembly requirements of an EISA system. Similarly, the EBC 110 provides the control function for an address EISA bus buffer or EBB 114. The address EBB 114 provides transceiving capabilities between the EISA bus E and the host bus H and in addition latches the HA bus signals to form the SA bus signals as appropriate.

The computer C includes certain fundamental components such as an interrupt system, a DMA controller and a number of timers, as well as arbitration of the EISA bus E. These components are all contained in the EISA system peripheral 116, which is connected to the HA, HC and SC buses. A chip referred to as the system glue chip 118 is connected to the EISA bus E and to a bus referred to as the XD or X data bus and performs numerous miscellaneous functions necessary in the computer system C.

Finally, a third bus, referred to as the X bus X, is provided to the connector 104. The X bus X has address XA, data XD and control SC portions. The XA lines are developed from the SA bus by means of a buffer 120, while the XD bus is formed from the SD bus by means of a buffer or transceiver 122. Preferably the XD bus is 16 bits wide, while the XA bus is the same width as the SA bus. The host bus H and the XD bus are provided to the connector 102 for provision to the processor board P. In addition, the XD bus is connected to the EISA system peripheral 116.

The I/O board I will not be described in more detail as it is not necessary for full disclosure. It is noted that operations initiated by the processor board P for execution on the EISA bus E are essentially interpreted and controlled through the EBC 110. For example, a shutdown cycle executed on the host bus H is interpreted by the 82358 version of the EBC 110, which consequently attempts to reset the microprocessor by asserting a signal RSTCPU*. A system using the 82358 uses the RSTCPU* signal to reset the microprocessor in the event erroneous operations are detected on the EISA bus E or if a shutdown cycle is detected. In the preferred embodiment, the variation of the 82358 is used for the EBC 110 generates a signal RST*, which is generated only on powerup conditions and is used on the system board S and input/output board I for reset indications. The 82358 version provides a separate reset signal for the power up condition.

Figure 3:
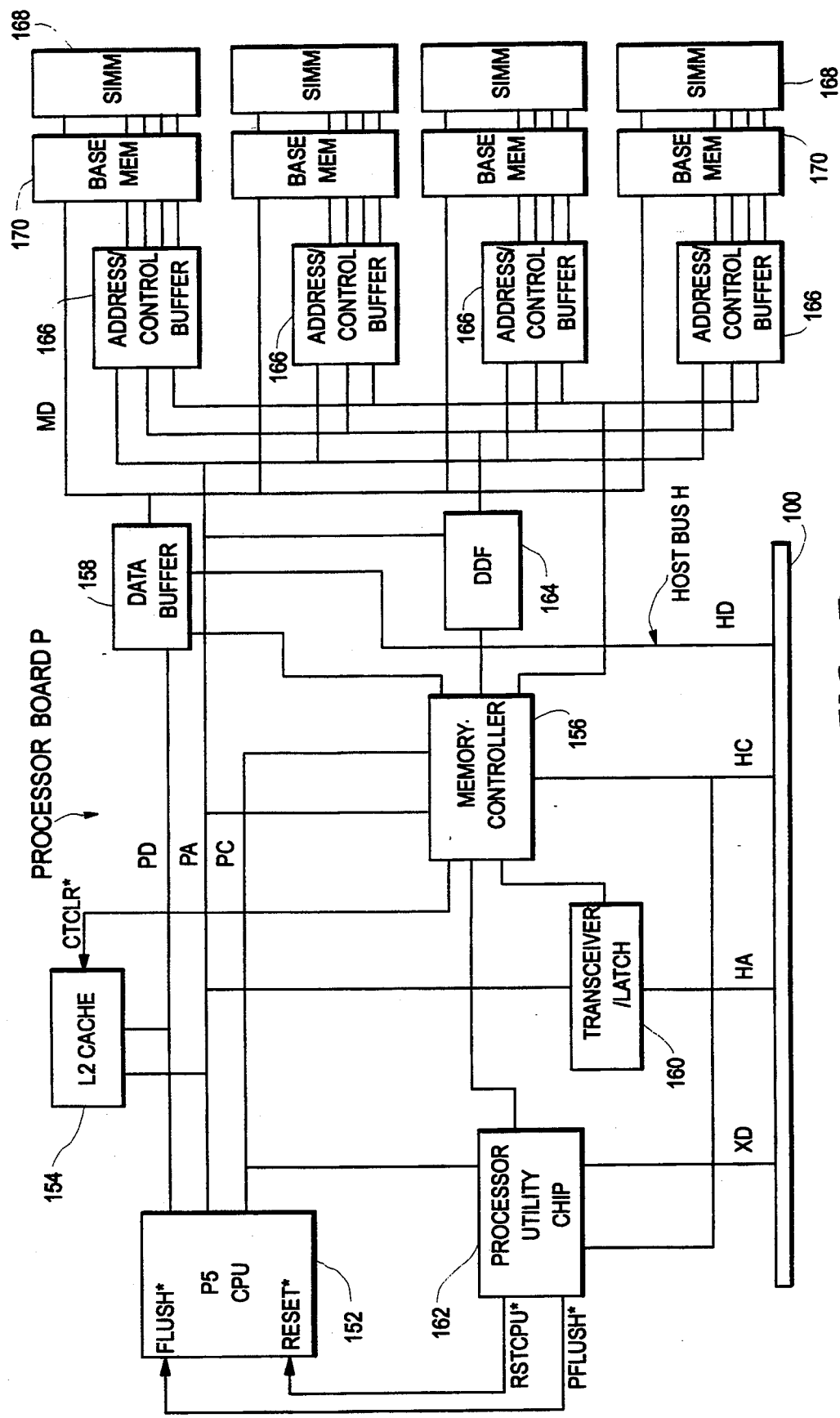
FIG. 3 is a block diagram of the processor board of FIG. 1.

Referring now to FIG. 3, the processor board P is shown in more detail. The primary component on the processor board P is the CPU 152, which preferably is the P5 or Pentium microprocessor from Intel, the next generation design after the i486. The P5 is a very high performance microprocessor having a superscalar architecture and integrated and separate code and data caches. In the preferred embodiment, the 66 Mhz version is utilized. Many of the signals of the P5 have a similar functions as the 80386 and i486 microprocessors. The reader is assumed to be familiar with the operation and interfacing of the 80386 and i486.

The CPU 152 operates in a similar manner as the 80386 and i486 microprocessors. The CPU 152 asserts an address status signal ADS*, which indicates that a new valid bus cycle is currently being driven. When the ADS* signal is asserted, the CPU 152 also asserts a signal M/IO* indicating whether the cycle is a memory or I/O operation, a signal W/R, indicating whether the cycle is a write or a read operation and a signal D/C* indicating a data or control cycle. The CPU 152 also asserts eight byte enable bits BE7*-BE0* indicating which bytes of data are to be read or written by the CPU 152. In general, the cycle is terminated by an external device asserting a processor burst ready signal PBRDY* to the CPU 152, indicating either that the external device has presented valid data for a read cycle or has accepted data in response to a write request. The CPU 152 also supports address pipelining where the next cycle may begin before the data phase of the previous cycle is completed. An external device asserts a next address signal NA* indicating preparedness to begin a new cycle before the current cycle is completed. The CPU 152 may thus begin a new cycle asserting the ADS* signal before or on the same clock cycle as when the PBRDY* signal is asserted.

The CPU 152 also supports 6 special cycles indicated by the M/IO* signal asserted low, the W/R* signal asserted high and the D/C* signal asserted low. The byte enable bits BE7*-BE0* are then used to determine which of the six special cycles is being performed, according to Table I at the end of this description.

The first four special cycles, shutdown, flush, halt and write back, are the same as for the 80386 and i486 as known to those skilled in the art. The CPU 152 executes cycles to flush its internal cache upon assertion of a signal PFLUSH* on its FLUSH* input pin.

Three buses are connected to the CPU 152, the PD or processor data bus, the PA or processor address bus and the PC or processor control bus. A second level (L2) cache 154 is connected to the PD and PA buses and receives control signals from a memory controller 156. In the preferred embodiment, the memory controller 156 is a single ASIC which contains conventional memory controller functions and additionally includes the cache controller capabilities necessary to operate the L2 cache 154.

The memory controller 156 is also connected to a unit referred to as the DDF or data destination facility 164. The DDF 164 performs memory module enabling, address translation and memory segment or page property storage. The DDF 164 provides memory capabilities to indicate which particular bank of memory is to be enabled, performs address translation on a 128 kbyte boundary and provides indications of certain characteristics of each 128 k block, such as whether it is located in the main memory on the processor board P or is external, write protected, high speed, and/or cacheable and whether that portion can be utilized by a write-back cache.

The memory portion of the processor board P is provided as four identical modules, each module containing an address/control buffer 166, one socket for receiving an individual SIMM unit 168 and base memory 170. The address/control buffer 166 receives the PA bus, the address and enable outputs of the DDF 164 and control signals from the memory controller 156. The outputs of the address/control buffer 166 are the addresses provided to the SIMMs 168 or base memory devices 170 and other control signals. These signals are provided to each of the SIMMs 168 and the base memory devices 170. Additionally, each SIMM 168 or base memory device 170 is connected to the memory data bus MD. As indicated, there are four like modules. Other configurations of the processor board P could be developed, with variations obvious to one skilled in the art, with certain details provided below.

A data buffer 158 is connected to the PD bus and develops two new buses, the HD or host data bus and the MD or memory data bus. The HD bus is connected to the connector 100 for connection to the system board S. The data buffer 158 is controlled by the memory controller 156. A transceiver/latch unit 160 is connected between the PA bus and the HA bus to provide latching and transceiving capabilities of addresses between the CPU 152 and the host bus H. The transceiver/latch 160 is controlled by the memory controller 156 to allow posting of cycles from the processor bus to the host bus H.

A processor utility chip 160 provides certain necessary utility operations for use with the CPU 152. The processor utility chip 162 is connected to the XD bus and the host bus H, particularly the HC portion, and is controlled by the memory controller 156. The output of the processor utility chip 162 is preferably provided to the PC bus to provide control functions of the CPU 152. The processor utility chip 162 monitors control signals of the CPU 152 and the host bus H to determine when to assert the PFLUSH, signal. In general, the conditions for flushing the internal cache of the CPU 152 include write cycles to certain I/O ports, clearing a cache enable bit, the execution of certain invalidate instructions by the CPU 152, such as the one which provides the flush special cycle, which special cycle is decoded by the processor utility chip 162, and write operations to a RAM relocation port. In response to the assertion of the PFLUSH* signal, the CPU 152 flushes its internal write-back cache. When this operation is complete, the CPU 152 executes the flush acknowledge special cycle to indicate to external devices, such as the memory controller 156, that the CPU 152 has completed its internal flush. The CPU 152 then expects the PBRDY* signal to end the cycle. As will be described more fully below, the memory controller 156 interprets the special flush acknowledge cycle and asserts a signal CTCLR* to flush the L2 cache 154 and provides the required PBRDY* signal.

The processor utility chip 162 also performs other non-cache functions such as numeric coprocessor logic, microprocessor reset generation and parity error logic, among others. For example, in the preferred embodiment if the processor utility chip 162 detects a shutdown cycle executed on the host bus H, it asserts an RSTCPU* signal to the CPU 152. In the preferred embodiment this RSTCPU, signal is used to reset the processor 152. In embodiments where the EBC 110 is the 82358, the processor utility chip 162 does not perform this shutdown cycle interpretation function, but would use the RSTCPU, signal from the 82358 in combination with other signals, such as a signal indicating power up, to provide a reset signal to the CPU 152.

The sixth special cycle is a branch trace message cycle which is performed if a tracing enable bit is set and if a branch instruction within the software of the CPU 152 is encountered and the branch is taken. This special cycle is used for P5 execution tracing.

Figure 4:
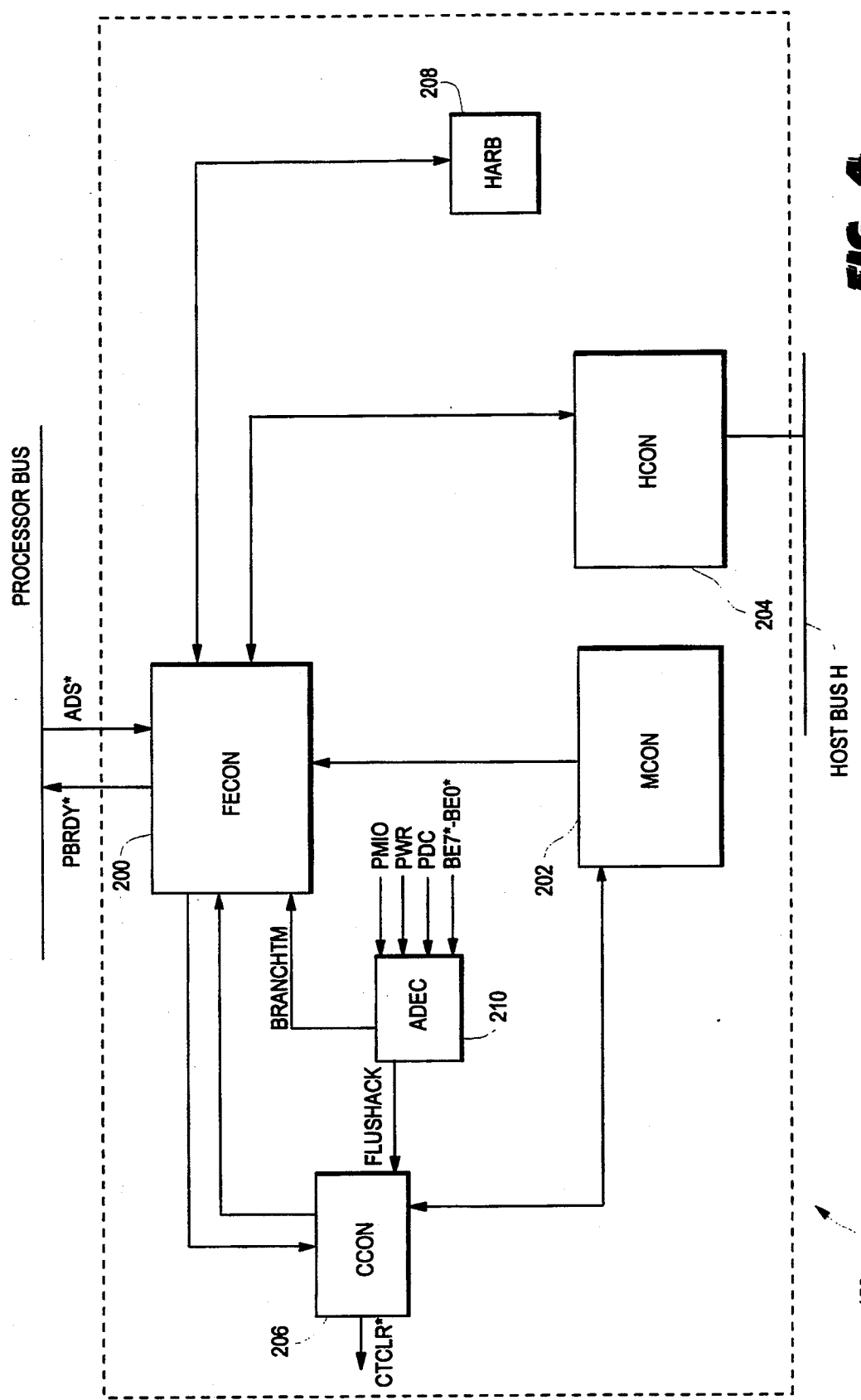
FIG. 4 is a block diagram of the major portions of the memory controller of FIG. 3.

Referring now to FIG. 4, the significant portions of the memory controller 156 are shown. Preferably the memory controller 156 is organized as a series of independent and interdependent blocks. Each of these blocks is logically organized to relate to a particular external unit, such as the L2 cache 154, the processor, the memory, the host bus H or arbitration. A first block is referred to as FECON or the front end controller 200. The FECON 200 interacts with the CPU 152 for receipt of cycle start signals from the CPU 152 including the ADS, signal, and provides signals which activate a memory controller block or MCON 202, a cache controller block or CCON 206 and a host bus controller block or HCON 204. Similarly, the FECON 200 provides completion signals, including the PBRDY* signal, to the CPU 152 when appropriate upon receipt of handshake signals from the MCON 202 and the HCON 204.

In general, memory read and write cycles are controlled by the MCON 202, which provides a memory read early PBRDY signal MREPBRDY, or a memory write early PBRDY signal MWEPBRDY signal to the FECON 200 to acknowledge completion of the corresponding memory read and write cycles. In a like manner, the HCON 204 provides a host read early PBRDY signal HREPBRDY, or a host write early PBRDY signal HWEPBRDY to the FECON 200 to acknowledge completion of the corresponding host read or write cycles, respectively. These signals are designated as early signals because they are provided one processor clock before the actual assertion of the PBRDY, signal. As will be described further below, the FECON 200 uses these signals to develop the PBRDY* signal provided to the CPU 152 to complete the cycle.

The FECON 200 also provides signals to the data buffer 158 to latch processor write data and enable processor read data. The MCON 202 interfaces with the address/control buffers 166 to provide the necessary control signals and the data buffer 158 to latch data from the memory and enable data to the memory. The HCON 204 interfaces with the host bus H to provide the necessary signals for its operation. The HCON 204 further communicates with the data buffer 158 to latch data from the host bus H and enable data to the host bus H.

The CCON 206 is the L2 cache 154 controller and interfaces with the FECON 200 and the L2 cache 154 to provide complete cache controller functions. Preferably the L2 cache is a 256 kbyte, direct mapped, write-through, lookaside cache for simplicity of logic and operations. A host arbitration block or HARB 208 interfaces with the FECON 200 to provide processor and host bus arbitration.

Preferably, the FECON 200, MCON 202 the CCON 206 and the HCON 204 are comprised of a plurality of state machines, each acting independently and interdependently. Other loose logic is provided within the memory controller 156 for interfacing the state machines, for providing register signals and for performing other miscellaneous support functions. Each state machine receives certain signals to commence its operation and proceeds according to the receipt of other signals. The various tasks necessary for the memory controller operation are split between these numerous state machines, and between the control blocks as indicated, to allow pipelining and multiple concurrent cycles without requiring an overly complex single master state machine. By the use of the plurality of individual state machines, each operation is allowed to proceed at its greatest possible rate, stopping only when another signal or information is necessary to allow it to proceed.

An address decoder block or ADEC 210 monitors signals PMIO, PWR and PDC which are versions of the M/IO*, W/R* and D/C* signals from the CPU 152, respectively. The ADEC 210 also monitors the byte enable bits BE7*-BE0* to decode the special cycles being executed by the CPU 152. When the special flush acknowledge cycle is indicated, the ADEC 210 asserts a signal FLUSHACK to the FECON 200. When the branch trace message special cycle is indicated, the ADEC 210 asserts a signal BRANCHTM to the CCON 206. In either case, the PMI0 and PDC signals are negated low and the PWR is asserted high. With reference to Table I, a flush acknowledge cycle is indicated by the BE4* bit asserted and the branch trace message cycle is indicated by the BE5* bit asserted.

It is noted that cycles executed on the processor bus by the CPU 152 and intended for the host bus H are essentially filtered by the memory controller 156 through the FECON 200. Cycles passed to the HCON 204 are then performed on the host bus H. The HCON 204 converts the 66 MHz 64-bit cycle into two 33 Mhz 32-bit cycles for proper execution on the host bus H. However, if the cycle is 32 bits or less, only one cycle is performed on the host bus H. The HCON 204 provides the HREPBRDY and HWEPBRDY signals to the FECON 200 to acknowledge the cycles, as described previously. As one of the functions of the cycle conversion, the HCON 204 remaps the upper byte enable bits BE7*-BE4* to the lower four byte enable bits BE3*-BE0* for the second of the 32 bit cycles. This would result in erroneous operation if the branch trace message or the flush acknowledge special cycles were executed, since the processor utility chip 162 and the 82358 version of the EBC 110 would misinterpret these two new special cycles as a shutdown or a flush cycle respectively. Thus, upon execution of the two new special cycles, the FECON 200 serves as a filter so that these two special cycles are not passed to the HCON 204, and thus are not executed on the host bus H.

The ADEC 210 decodes the flush acknowledge special cycle and asserts a signal FLUSHACK act to the CCON 206. The CCON 206 includes an internal state machine which tracks the processor bus cycles executed by the CPU 152 and asserts a signal CTCLR* to the L2 cache 154 if the L2 cache 154 is installed. The CCON 206 then asserts a signal CRDY to the FECON 200, which correspondingly asserts the PBRDY* signal to the CPU 152 to acknowledge the flush acknowledge special cycle. The specific operation of the CCON 206 in response to the special flush acknowledge cycle is more completely explained in U.S. patent application Ser. No. 08/044/379, entitled FLUSHING A CACHE BY MONITORING AND DECODING PROCESSOR BUS CYCLES, filed concurrently herewith, and which is hereby incorporated by reference. Thus the flush acknowledge special cycle is handled entirely outside of the HCON 204, so that the cycle is never converted to a host bus H cycle and therefore is not misinterpreted by the processor utility chip 162 or the 82358 version of the EBC 110.

Figure 5:
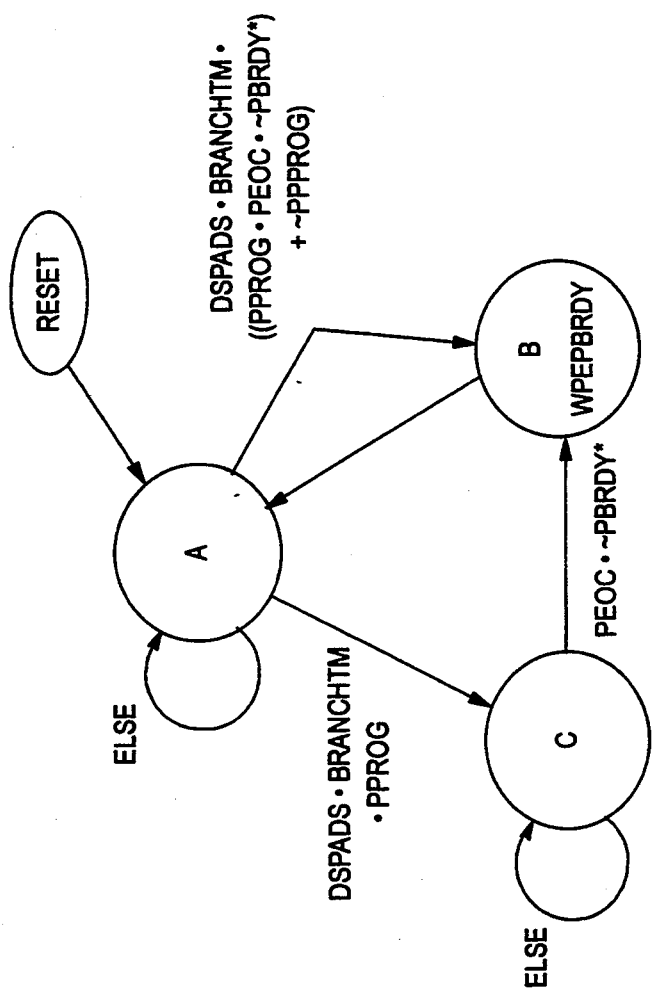
FIG. 5 is a state machine diagram illustrating operation of a state machine within the front end controller block of FIG. 4.

Referring now to FIG. 5, a simplified state machine diagram is shown illustrating the operation of a write protect early PBRDY* (WPEPBRDY) state machine within the FECON 200 in response to decoding a branch trace message special cycle. The WPEPBRDY state machine is shown to illustrate response to a branch trace message special cycle. It has been simplified since other signals used for other types of cycles and purposes have been omitted. These signals are ignored for purposes of simplicity and clarity.

The WPEPBRDY state machine begins at state A upon reset and transfers to state B if a signal DSPADS signal is true, a branch trace message has been decoded as indicated by the BRANCHTM signal, and a processor cycle is not in progress, as indicated by a signal PPROG being negated, or a processor cycle in progress is ending, as indicated by a processor end of cycle (PEOC) signal asserted and the PBRDY* signal asserted. A tilde "~" sign preceding a signal name indicates negation of the signal for use in the equations. The DSPADS signal is a delayed, synchronized version of the ADS* signal indicating a new processor cycle. A processor progress state machine is used for basic cycle tracking of the processor bus and provides the processor cycle in progress signal PPROG and the processor end of cycle signal PEOC.

Control proceeds from state A to state C if the DSPADS signal is true, a branch trace message has been decoded, and a processor cycle is in progress (but not ending). Otherwise control remains at state A. Control always proceeds from state B to state A on the next rising edge of the PCLK signal. Control proceeds from state C to state B when the cycle in progress is completed, as indicated by the PEOC and PBRDY* signals being asserted. Otherwise control remains at state C. A signal WPEPBRDY is asserted in state B. Thus, the WPEPBRDY state machine is used to generate the processor PBRDY, signal in the case of branch trace message special cycles. Again, the cycle is handled entirely outside of the HCON 204, so that the branch trace message special cycle is never converted to a host bus cycle H and therefore is not misinterpreted.

The FECON 200 develops a signal IEPBRDY by ORing together the MREPBRDY, MWEPBRDY, HREPBRDY, HWEPBRDY, WPEPBRDY and CRDY signals together. The IEPBRDY signal is provided to the input of a D-type flip-flop in the cases of interest. The flip-flop is clocked by the processor clock signal, PCLK. The inverted output of the D-type flip-flop is the PBRDY* signal provided to the CPU 152 across the processor bus.

It can now be appreciated that the two new special cycles including the flush acknowledge and branch trace message special cycles are filtered by the memory controller and are not allowed to appear on the host bus H. Otherwise, these two special cycles would be misinterpreted by the processor utility chip 162 or the 82358 version of the EBC 110 causing erroneous operation. Essentially, the flush acknowledge special cycle is handled by the CCON 206 to flush the optional second level cache 154, and the branch trace message special cycle is, for the most part, ignored by the FECON 200. By using this type of filtering through the memory controller 156, the substantial capabilities of the P5 processor by Intel can be incorporated into the processor board and coupled to the host bus of a computer system designed primarily for the 80386 and i486 microprocessor based systems. In this manner, full compatibility is achieved.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

TABLE I

| CPU 52 SPECIAL CYCLES | | | | | | | | |
|---|---|---|---|---|---|---|---|---|
| BE7* | BE6* | BE5* | BE4* | BE3* | BE2* | BE1* | BE0* | SPECIAL CYCLE |
| 1 | 1 | 1 | 1 | 1 | 1 | 1 | 0 | Shutdown |
| 1 | 1 | 1 | 1 | 1 | 1 | 0 | 1 | Flush (INVD, WBINVD instr) |
| 1 | 1 | 1 | 1 | 1 | 0 | 1 | 1 | Halt (Halt instruction) |
| 1 | 1 | 1 | 1 | 0 | 1 | 1 | 1 | Write Back (WBINVD instruction) |
| 1 | 1 | 1 | 0 | 1 | 1 | 1 | 1 | Flush Acknowledge (FLUSH* assertion) |

TABLE I-continued

| CPU 52 SPECIAL CYCLES | | | | | | | | |
|---|---|---|---|---|---|---|---|---|
| BE7* | BE6* | BE5* | BE4* | BE3* | BE2* | BE1* | BE0* | SPECIAL CYCLE |
| 1 | 1 | 0 | 1 | 1 | 1 | 1 | 1 | Branch Trace Message |

We claim:

1. A computer system, comprising:

a processor bus;

a CPU coupled to said processor bus for executing cycles on said processor bus initiated by a cycle start signal and terminated by a cycle end signal, wherein types of cycles executed by said CPU include flush acknowledge and branch trace message special cycles;

a host bus; and means coupled to said processor bus and said host bus for executing cycles on said host bus in response to cycles executed on said processor bus intended for said host bus, said means for executing comprising:

a front end controller coupled to said processor bus for receiving said cycle start signal from said CPU and a ready signal and for providing said cycle end signal to said CPU; and a cache controller for determining if said flush acknowledge special cycle is present and for providing said ready signal to said front end controller if said flush acknowledge special cycle is present, wherein said front end controller develops said cycle end signal if said branch trace message special cycle is determined to be present or if said front end controller receives said ready signal.

2. The computer system of claim 1, wherein:

said CPU provides control and byte enable signals indicative of the type of cycle; and wherein said front end controller and said cache controller receive and decode said control and byte enable signals for determining the cycle type.

3. The computer system of claim 2, wherein said control signals include a memory-I/O signal, a data-control signal and a write-read signal, and wherein said byte enable signals comprise a plurality of byte enable bits indicating one of a plurality of special cycles, said special cycles including said flush acknowledge and said branch trace message special cycles.

4. The computer system of claim 1, wherein said front end controller includes means for determining if said branch trace message special cycle is present and providing a second ready signal upon such determination, and wherein said front end controller is responsive to said second ready signal to develop said cycle end signal.

5. A computer system, comprising:

a host bus for transferring data of a first predetermined width and having control signals associated with said first predetermined width data, said control signals providing indications of a first predetermined number of special cycles;

a device connected to said host bus for monitoring operations and indicating if a particular special cycle is present;

a processor bus for transferring data of a second predetermined width and having control signals associated with said second predetermined data width, wherein said second predetermined data width is greater than said first predetermined data width, said control signals providing indications of a second number of special cycles, said second number of special cycles being greater than said first number of special cycles, said second number of special cycles including said first number of special cycles and additional special cycles, and wherein if processor bus cycles are converted to host bus cycles, one of said additional special cycles is converted to said particular special cycle being monitored by said device;

a CPU coupled to said processor bus for executing cycles on said processor bus including said second number of special cycles; and means coupled to said processor bus and said host bus for converting processor bus cycles to host bus cycles, said means for converting determining if one of said additional special cycles is present and responding to said one of said additional special cycles without converting said one of said additional special cycles to host bus cycles.

6. The computer system of claim 5, wherein said device provides an indication of a plurality of particular special cycles, wherein a plurality of said additional special cycles would convert to said plurality of particular special cycles and wherein said means for converting responds to said plurality of additional special cycles without converting said plurality of additional special cycles to host bus cycles.

7. The computer system of claim 6, wherein said first predetermined special cycles include shutdown, halt, flush and writeback cycles and said plurality of additional cycles includes flush acknowledge and said branch trace message cycles, wherein said flush acknowledge and branch trace message cycles would be converted to shutdown and flush cycles.

* * * * *